United States Patent
Ootsu et al.

(10) Patent No.: US 6,583,829 B2
(45) Date of Patent: Jun. 24, 2003

(54) LIQUID CRYSTAL DISPLAY HAVING AN OPENING IN EACH PIXEL ELECTRODE CORRESPONDING TO EACH STORAGE LINE

(75) Inventors: Ryouichi Ootsu, Mobara (JP); Kimitoshi Ohgiichi, Mobara (JP)

(73) Assignee: Hitachi, Ltd., Tokyo (JP)

( * ) Notice: Subject to any disclaimer, the term of this patent is extended or adjusted under 35 U.S.C. 154(b) by 17 days.

(21) Appl. No.: 09/797,675

(22) Filed: Mar. 5, 2001

(65) Prior Publication Data

US 2001/0019372 A1 Sep. 6, 2001

(30) Foreign Application Priority Data

Mar. 6, 2000 (JP) .................................. 2000-061059

(51) Int. Cl.[7] .................... G02F 1/1343; G02F 1/136
(52) U.S. Cl. ..................... 349/43; 349/38; 349/42
(58) Field of Search .......................... 349/38, 42, 43

(56) References Cited

U.S. PATENT DOCUMENTS

| 4,639,087 A | * | 1/1987 | Cannella et al. ............... 349/38 |
| 6,052,162 A | * | 4/2000 | Shimada et al. ............... 349/38 |
| 6,057,896 A | * | 5/2000 | Rho et al. ..................... 349/42 |

FOREIGN PATENT DOCUMENTS

| JP | 11-231341 | 8/1999 |
| JP | 2000-221527 | 8/2000 |

* cited by examiner

*Primary Examiner*—Julie Ngo

(57) ABSTRACT

A liquid crystal display element includes a pair of substrates, a liquid crystal layer sandwiched therebetween, gate lines and drain lines disposed to intersect the gate lines disposed on one of the substrates, thin film transistors disposed at the intersections of the gate and drain lines, pixel electrodes disposed in an area surrounded by two adjacent gate lines and two adjacent drain lines, a common electrode disposed on the other substrate. The liquid crystal display element is also provided with storage lines disposed below the pixel electrodes with an insulating layer interposed therebetween to form a capacitance therebetween. Each of the pixel electrodes is formed with an opening in a portion thereof facing the storage lines.

6 Claims, 18 Drawing Sheets

LIQUID CRYSTAL DISPLAY HAVING AN OPENING IN EACH PIXEL ELECTRODE CORRESPONDING TO EACH STORAGE LINE

BACKGROUND OF THE INVENTION

The present invention relates to a liquid crystal display element, and in particular to a thin film transistor active-matrix type liquid crystal display element provided with a storage capacity formed in a pixel area by a storage line disposed therein and a pixel electrode.

Liquid crystal display devices are widely used as a high-definition color display device for a notebook computer and a display monitor.

Among liquid crystal display elements, the simple matrix type and the active matrix type are well-known. The simple matrix type liquid crystal display element comprises a pair of opposing substrates, a first group of parallel strip electrodes disposed on an inner surface of one of the substrates, a second group of parallel strip electrodes disposed on an inner surface of the other substrate to intersect the first group of parallel strip electrodes, and a liquid crystal layer sandwiched between the substrates. The active matrix type liquid crystal display element comprises a pair of opposing substrates, a plurality of switching elements each provided for selecting a respective pixel and disposed on an inner surface of one of the substrates, and a liquid crystal layer sandwiched between the substrates.

The active matrix type liquid crystal display element is divided into the so-called vertical electric field type which usually called the TN (the Twisted Nematic) type and the so-called horizontal electric field type which is usually called the IPS (the In-Plane-Switching type). In the so-called vertical electric field type as represented by the TN type, two groups of strip electrodes for selection of pixels are disposed on inner surfaces of a pair of upper and lower substrates, respectively. In the so-called horizontal electric field type, two groups of electrodes for selection of pixels are disposed only on an inner surface of one of a pair of upper and lower substrates.

In the TN type active-matrix liquid crystal display element, liquid crystal molecules are oriented to be twisted through 90 degrees, for example, between a pair of opposing substrates. A pair of polarizers are disposed in front of and behind the liquid crystal display element, respectively, such that their absorption axes are at right angles (the arrangement of crossed nicols) with the absorption axis of a polarizer on the entrance side is parallel with or perpendicular to the rubbing direction of the entrance-side substrate.

In the TN type active-matrix liquid crystal display element, first suppose that no electric field is applied across the liquid crystal layer. The incident light is converted into a linearly polarized light by the entrance-side polarizer, the linearly polarized light propagates along the twist of the liquid crystal molecules, and then all of the linearly polarized light passes through the exit-side polarizer and provides a white display if an azimuthal angle of the transmission axis of the exit-side polarizer is identical with that of the linearly polarized light entering the exit-side polarizer. This is the so-called normally open mode.

Next, suppose that an electric field is applied across the liquid crystal layer. The direction (director) of a unit vector representing the average direction of orientations of axes of liquid crystal molecules of the liquid crystal layer is perpendicular to the surface of the substrate, the azumuthal angle of the linearly polarized light entering the liquid crystal layer is not changed, and as a result, it is identical with that of the absorption angle of the exit-end polarizer and consequently, the liquid crystal display element provides a black display. For further detail, see "Basics and Application of Liquid Crystal," Industrial Research Association, Tokyo, 1991.

As described above, the TN type liquid crystal display element includes a pair of opposing transparent insulating substrates made of material such as glass, a liquid crystal layer sandwiched between the opposing glass substrates, a group of scanning signal lines (hereinafter also called gate signal lines) extending in the x direction and arranged in the y direction on the liquid-crystal layer side surface of one of the substrates in a system of rectangular co-ordinates, and a group of drain lines (hereinafter also called video signal lines) insulated from the gate signal lines, extending in the y direction, and arranged in the x direction.

A pixel area is formed in an area surrounded by two adjacent gate lines and two adjacent drain lines, and all the pixel areas form a display area. Formed in each pixel area are a thin film transistor (TFT) serving as an active element (a switching element), for example, and a transparent pixel electrode.

A scanning signal supplied to a gate line switch on a thin film transistor which, in turn, supplies a video signal to a pixel electrode from a drain line.

A capacitance formed by a dielectric of the lighted liquid crystal is not sufficient to maintain the ON (lighted) state of the pixel which has been driven by the thin film transistor during a specified period of time, and therefore an additional capacitance is provided to each pixel so as to replenish the shortage of the capacitance. The additional capacitance has been provided by overlaying a portion of the pixel electrode on the gate line with an insulating layer interposed therebetween.

On the other hand, a storage method is suggested which disposes a storage line in the pixel area and forms a capacitance (a storage capacitance) using a pixel electrode, the storage line and an insulating layer therebetween.

Storage type liquid crystal display devices are disclosed in Japanese Patent Application Laid-open No. Hei 11-231341 (laid-open on Aug. 27, 1999), Japanese Patent Application Laid-open No. 2000-221527 (laid-open on Aug. 11, 2000), and Japanese Utility Model Registration No. 2536632 (registered on Feb. 21, 1997).

FIG. 13 shows an equivalent circuit of a storage type liquid crystal display element. In the storage type liquid crystal display element, a plurality of gate lines GL and a plurality of drain lines DL are disposed to intersect one another in a display area AR on one of a pair of opposing substrates, a thin film transistor TFT is disposed at each of intersections of the gate lines GL and the drain lines DL, and a plurality of storage lines STL are disposed between and parallel with the gate lines GL. Reference character ITO2 denotes a common electrode disposed on an inner surface of the other substrate.

A source electrode (the roles of source and drain may be exchanged in a driving cycle) of the thin film transistor TFT is connected to the pixel electrode ITO1, a liquid crystal capacitance Clc is formed between the pixel electrode ITO1 and the common electrode ITO2 with a liquid crystal therebetween serving as a dielectric, and a storage capacity Cstg is formed between the pixel electrode ITO1 and the storage line STL.

The common electrode ITO2 is supplied with a specified voltage (preferably a fixed voltage) from a common-electrode driving circuit CDR, and the storage lines STL are supplied with a specified voltage (preferably a fixed voltage) from a storage-line driving circuit STR. Reference character GDR denotes a gate line driving circuit, DDR is a drain line driving circuit, CONT is a display control circuit for supplying display signals and timing signals.

FIG. 14 is a plan view of essential parts of a unit pixel and its vicinity formed on a substrate SUB1 of the storage type liquid crystal display element. In FIG. 14, certain of the shapes and dimensions are exaggerated for clarity.

FIG. 15 is a schematic cross-sectional view of the storage type liquid crystal display element taken along line XV—XV of FIG. 14.

In FIG. 14, each pixel is disposed in an area surrounded by two adjacent gate lines GL and two adjacent drain lines intersecting the gate lines GL, and is provided with a thin film transistor TFT at their intersection. The thin film transistor TFT is comprised of the gate line GL, an insulating film (not shown to avoid undue complication of the drawing) covering the gate line GL, a semiconductor layer 100 made of amorphous silicon with the insulating film formed on the insulating film, a pair of a source electrode SD1 and a drain electrode SD2 which are disposed to oppose each other on the semiconductor layer 100. A semiconductor layer integral with the semiconductor layer 100 is disposed below the drain line DL so as to reduce step heights. Reference character SH denotes light-shielding members, reference numeral 102 are openings made in the gate lines GL for the purpose of reducing line defects.

The pixel electrode ITO1 made of transparent conductive film is formed in the pixel area and is connected to the source electrode SD1 of the thin film transistor TFT. The storage line STL is formed in parallel with the gate lines GL, below the pixel electrode ITO1 with an insulating layer interposed (not shown for clarity in FIG. 14, but should be understood to be present) between the pixel electrode ITO1 and the storage line STL in the pixel area. Reference numeral 103 denotes a contact hole made in the insulating layer.

Generally, the storage lines STL are fabricated from the same material as that of the gate lines GL and simultaneously with the gate lines GL. The drain electrode SD2 of the thin film transistor TFT is formed as an extension from the drain line DL.

As shown in FIG. 15, formed on the inner surface of the substrate SUB1 which is also called "the thin film transistor substrate" are the storage line STL, a first insulating layer SiN made preferably of silicon nitride, a second insulating layer PAS made of a passivation layer, and the pixel electrode ITO1, in the order named. The common electrode ITO2 is formed on the inner surface of the other substrate SUB2. A liquid crystal layer LC is sandwiched between the two substrates SUB1 and SUB2.

Although not shown in FIGS. 14 and 15, orientation films for orientating liquid crystal molecules are disposed on the respective surfaces of the pixel electrodes ITO1 and the common electrode ITO2, are in direct contact with the liquid crystal layer. In the color liquid crystal display element, three-color filters are disposed below the common electrode ITO2 on the substrate SUB2, and in this case, the substrate SUB2 is also called "a color filter substrate."

In FIG. 15, the storage capacitance Cstg shown as a hatched area is formed by the pixel electrode ITO1, the storage line STL, the first insulating layer SiN and the second insulating layer PAS.

The storage capacitance Cstg is determined by the area of the overlap between the pixel electrode ITO1 and the storage line STL, and is therefore determined by the shape and dimensions of the storage line, and consequently, the exact establishment of the storage capacitance Cstg is difficult, and also the resistance is increased.

The common electrode ITO2 also overlies the gate lines GL and the drain lines DL with the liquid crystal layer interposed therebetween, and therefore a large wiring capacitance is formed between the common electrode ITO2 and the drain and gate lines GL, DL, and consequently delay caused by wiring produces brightness grading in a display image.

FIG. 16 is a schematic cross-sectional view of the liquid crystal display element for explaining a wiring capacitance formed by the gate line GL, and FIG. 17 is a schematic cross-sectional view of the liquid crystal display element for explaining a wiring capacitance formed by the drain line DL. Positioned over the gate line GL are the first insulating layer SiN, the second insulating layer PAS, the liquid crystal layer LC and the common electrode ITO2. Positioned over the drain line DL are the second insulating layer PAS, the liquid crystal layer LC and the common electrode ITO2. Formed between the wiring lines GL, DL and the common electrode ITO2 are wiring capacitances having configurations indicated by broken lines in FIGS. 16 and 17, respectively.

The larger the size of the liquid crystal display element, the longer the lengths of the storage lines STL, the gate lines GL and the drain lines DL, and the larger the wiring capacitances, and therefore the so-called wiring delays occur. Consequently, there is a problem in that flicker or brightness grading occurs in a displayed image.

A voltage supply to the common electrode ITO2 is made via a conductive paste disposed in the vicinity of the sealing member sealing a pair of substrates together along peripheries of a display area of the substrates. The conductive paste is sandwiched between a common-electrode voltage supply line formed on the substrate SUB1 and the common electrode ITO2 formed on the other substrate SUB2.

FIG. 18 is a schematic plan view of the liquid crystal display element for explaining an example of positions of the conductive pastes for electrically connecting the common-electrode voltage supply line on the substrate SUB1 to the common electrode ITO2 on the substrate SUB2.

In this liquid crystal display element, the substrates SUB1 and SUB2 are sealed together by placing the substrate SUB2 over the substrate SUB1 with a sealing member SL interposed therebetween along the periphery of the display area AR of the substrates SUB1 and SUB2.

The common-electrode voltage supply line (not shown) is formed in the vicinity of the sealing member SL on the substrate SUB1. In the sealing operation, the conductive paste CPT is coated to overlie the common-electrode voltage supply line at positions such as corners of the sealing member SL coated on the substrate SUB1, and then the substrate SUB2 is placed over the substrate SUB2 such that the common electrode ITO2 on the inner surface of the substrate SUB2 is electrically connected to the conductive paste CPT to make possible application of a specified voltage to the common electrode ITO2.

A voltage supply to the storage lines STL is made by connecting a storage-line voltage supply line (not shown) formed in the vicinity of the sealing member SL on the inner surface of the substrate SUB1 to a power supply (a storage-line driving circuit) at one side or both sides of the display area.

However, there is a problem in that, the longer the storage lines, the larger the resistance and a wiring capacitance, and fluctuations in potentials occur, and consequently, flicker and brightness grading occur in a display and they deteriorate the quality of the display.

As for a measure against these, the number of the coated conductive pastes can be increased, the coating operation of the conductive pastes requires a lot of time, and as a result, the so-called tact time is increased. In a driving method employing the common-electrode voltage inversion, it is difficult to reduce the number of the points for voltage supply because a signal is supplied to the common electrode.

SUMMARY OF THE INVENTION

It is an object of the present invention to provide a liquid crystal display element capable of suppressing occurrence of flicker and brightness grading in a display by solving the problems with the prior art, facilitating the establishment of a desired storage capacitance, and reducing a storage capacitance, wiring capacitances formed by gate lines or drain lines, and further capable of improving a manufacturing tact.

To achieve the above object, the present invention is capable of establishing the storage capacitance value in accordance with the storage line by providing an opening in a pixel electrode, reducing wiring capacitances of gate lines and/or drain lines by providing cutouts in a portion of a common electrode overlying (or being located at an opposite side of the liquid crystal layer to) the gate lines and/or the drain lines (e.g. by eliminating the portion of the common electrode so as to form an opening therein), or supplying a voltage to the common electrode or the storage lines by providing column-like conductive spacers between the common electrode and the storage lines without a conductive paste.

The following describes representative configurations of the liquid crystal display elements in accordance with the present invention.

In accordance with an embodiment of the present invention, there is provide a liquid crystal display element comprising: a pair of substrates; a liquid crystal layer sandwiched (or interposed) between the pair of substrates; a plurality of gate lines disposed on one of the pair of substrates; a plurality of drain lines disposed to be insulated from and intersect the plurality of the gate lines on the one of the pair of substrates; a plurality of thin film transistors disposed in a vicinity of intersections of the plurality of gate lines and the plurality of drain lines; a plurality of pixel electrodes made of transparent conductive material, each of the plurality of pixel electrodes being disposed in an area surrounded by two adjacent ones of the plurality of gate lines and two adjacent ones of the plurality of drain lines, and driven by a corresponding one of the plurality of thin film transistors; a common electrode disposed on another of the pair of substrates to face the plurality of pixel electrodes; and a plurality of storage lines disposed below the plurality of pixel electrodes with an insulating layer interposed between the plurality of storage lines and the plurality of pixel electrodes, each of the plurality of pixel electrodes being formed with an opening in a portion thereof facing a corresponding one of the plurality of storage lines.

In accordance with another embodiment of the present invention, there is provided a liquid crystal display element comprising: a pair of substrates; a liquid crystal layer sandwiched (or interposed) between the pair of substrates; a plurality of gate lines disposed on one of the pair of substrates; a plurality of drain lines disposed to be insulated from and intersect the plurality of the gate lines on the one of the pair of substrates; a plurality of thin film transistors disposed in a vicinity of intersections of the plurality of gate lines and the plurality of drain lines; a plurality of pixel electrodes made of transparent conductive material, each of the plurality of pixel electrodes being disposed in an area surrounded by two adjacent ones of the plurality of gate lines and two adjacent ones of the plurality of drain lines, and driven by a corresponding one of the plurality of thin film transistors; and a common electrode disposed on another of the pair of substrates to face the plurality of pixel electrodes, the common electrode being formed with cutouts in portions thereof facing at least one of (1) the plurality of gate lines and (2) the plurality of drain lines.

In accordance with another embodiment of the present invention, there is a liquid crystal display element comprising: a pair of substrates; a liquid crystal layer sandwiched (or interposed) between the of substrates; a plurality of gate lines disposed on one of the pair of substrates; a plurality of drain lines disposed to be insulated from and intersect the plurality of the gate lines on the one of the pair of substrates; a plurality of thin film transistors disposed in a vicinity of intersections of the plurality of gate lines and the plurality of drain lines; a plurality of pixel electrodes made of transparent conductive material, each of the plurality of pixel electrodes being disposed in an area surrounded by two adjacent ones of the plurality of gate lines and two adjacent ones of the plurality of drain lines, and driven by a corresponding one of the plurality of thin film transistors; a common electrode disposed on another of the pair of substrates to face the plurality of pixel electrodes; a plurality of storage lines disposed below the plurality of pixel electrodes with an insulating layer interposed between the plurality of storage lines and the plurality of pixel electrodes, each of the plurality of pixel electrodes and a portion of the insulating layer thereunder and being formed with an opening in a portion thereof facing a corresponding one of the plurality of storage lines, the opening passing through all thicknesses of the plurality of pixel electrodes and the insulating layer; a plurality of column-like conductive spacers, each of the plurality of column-like conductive spacers disposed in a respective one of the openings for electrically connecting one of the plurality of storage lines to the common electrode.

In accordance with another embodiment of the present invention, there is provided a liquid crystal display element comprising: a pair of substrates sealed together along peripheries thereof with a sealing member; a liquid crystal layer sandwiched (or interposed) between the pair of substrates; a plurality of gate lines disposed on one of the pair of substrates; a plurality of drain lines disposed to be insulated from and intersect the plurality of the gate lines on the one of the pair of substrates; a plurality of thin film transistors disposed in a vicinity of intersections of the plurality of gate lines and the plurality of drain lines; a plurality of pixel electrodes made of transparent conductive material, each of the plurality of pixel electrodes being disposed in an area surrounded by two adjacent ones of the plurality of gate lines and two adjacent ones of the plurality of drain lines, and driven by a corresponding one of the plurality of thin film transistors; a common electrode disposed on another of the pair of substrates to face the plurality of pixel electrodes; a lead disposed on the one of the pair of substrates for supplying a voltage to the common electrode; a plurality of storage lines disposed below the plurality of pixel electrodes with an insulating layer interposed between the plurality of storage lines and the plurality of pixel electrodes, each of the plurality of pixel electrodes and a portion of the insulating layer thereunder and being formed with an opening in a portion thereof facing a corresponding one of the plurality of storage lines, the opening passing through all thicknesses of the plurality of pixel electrodes and the insulating layer; a plurality of column-like conductive spacers, each of the plurality of column-like conductive spacers disposed in a respective one of the openings for electrically connecting one of the plurality of storage lines to the common electrode; and a column-like conductive spacer disposed in a vicinity of the sealing member for electrically connecting the common electrode to the lead.

In one of concrete structures of the aforementioned liquid crystal display devices according to the present invention, the plurality of storage lines are arranged to form a capacitance together with one of the plurality of pixel electrodes corresponding thereto and the insulating layer interposed between the one of the pixel electrodes and the one of storage lines, respectively. The vicinity of intersections of the plurality of gate lines and the plurality of drain lines defines an area not only close to the intersection but also any area where one of the plurality of thin film transistor can connect a gate electrode thereof electrically to one of the plurality of gate lines and a drain electrode thereof electrically to one of the plurality of drain lines, respectively. Each one of the plurality thin film transistor has a field effect type transistor structure which switches a current between a source electrode thereof and a drain electrode thereof in accordance with an electrical field applied by a gate electrode thereof, for example. While definitions of the source electrode and the drain electrode in the thin film transistor are reversed in accordance with a current direction therebetween, one of the source and drain electrodes being connected to one of the plurality of the drain lines will be defined as a drain electrode, and another of the source and drain electrodes being connected to one of the plurality of the pixel electrode will be defined as a source electrode, in this specification for convenience. In the other one of concrete structures of the aforementioned liquid crystal display devices according to the present invention, a conductive layer may be interposed between one of the plurality of storage lines and one of the column-like spacers to cover the one of the plurality of storage lines. In this structure, the conductive layer should be made of same material as that of the plurality of pixel electrodes, or of such an oxide material having electrical conductivity as an Indium-Tin-Oxide or an Indium-Zinc-Oxide.

The present invention. is not limited to the above configurations and the embodiments described subsequently, but various changes and modifications may be made without departing from the nature and spirit of the invention.

BRIEF DESCRIPTION OF THE DRAWINGS

In the accompanying drawings, in which like reference numerals designate similar components throughout the figures, and in which.

DETAILED DESCRIPTION

Now the embodiments of the present invention will be described in detail by reference to the drawings.

Figure 1:
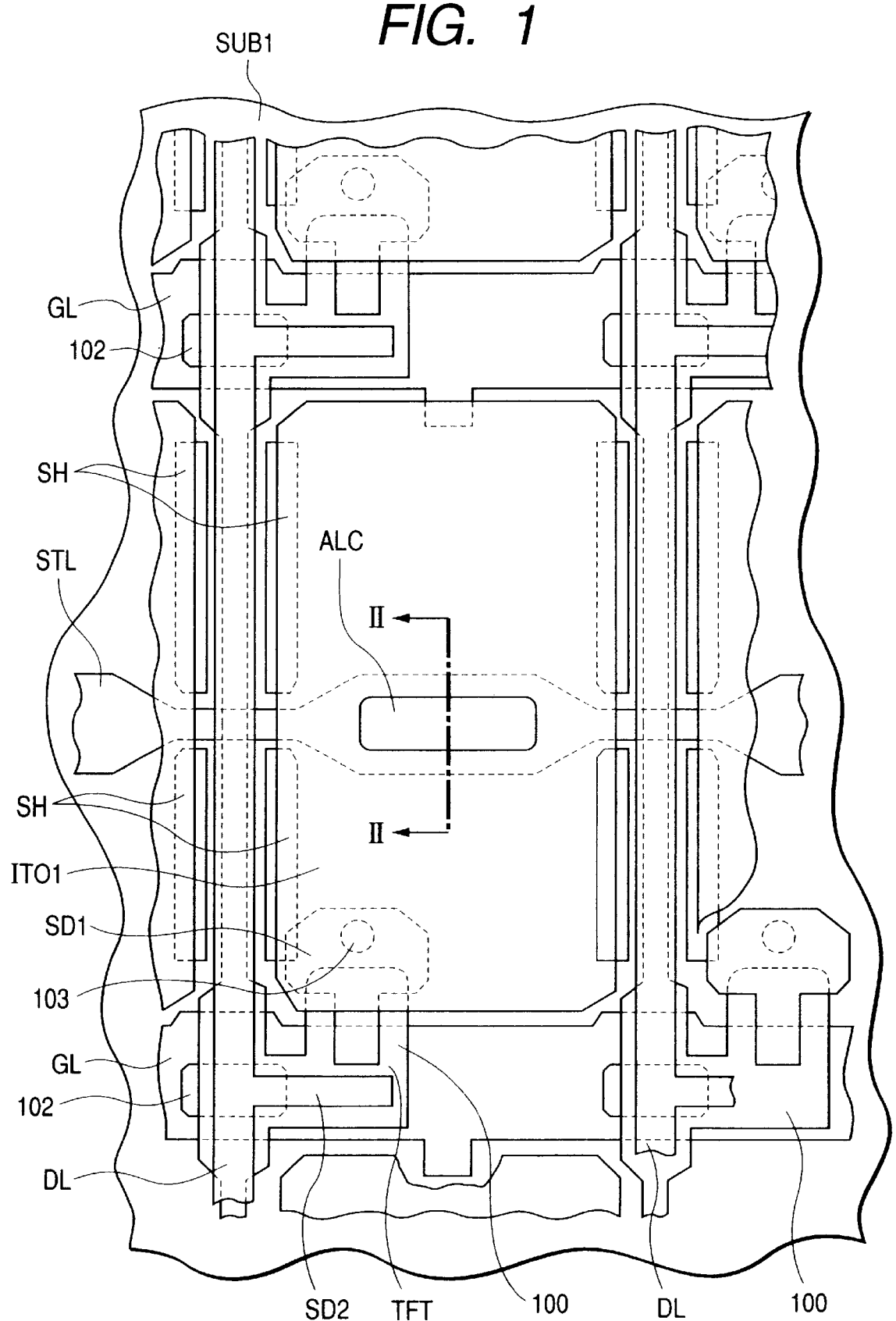
FIG. 1 is a plan view of essential parts of a unit pixel and its vicinity formed on a substrate of a storage type liquid crystal display element in accordance with the present invention.
Figure 2:
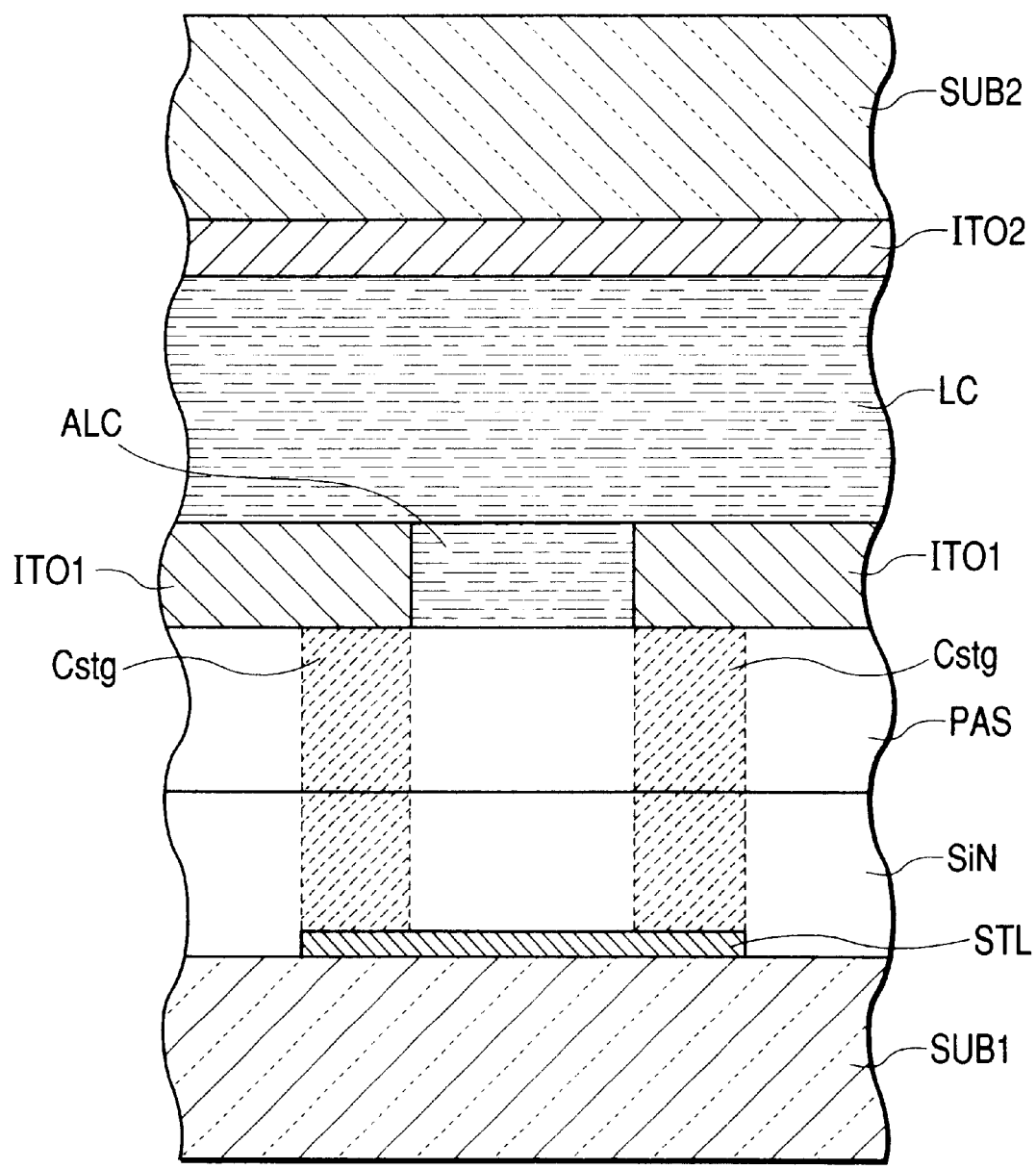
FIG. 2 is a schematic cross-sectional view of the storage type liquid crystal display element taken along line II—II of FIG. 1.

FIG. 1 is a plan view of essential parts of a unit pixel and its vicinity formed on a substrate of a storage type liquid crystal display element in accordance with the present invention, and FIG. 2 is a schematic cross-sectional view of the storage type liquid crystal display element taken along line II—II of FIG. 1. Reference character ALC denotes an opening, and the same reference characters and numerals as utilized in FIGS. 14 and 15 designate functionally corresponding portions in FIGS. 1 and 2.

Figure 14:
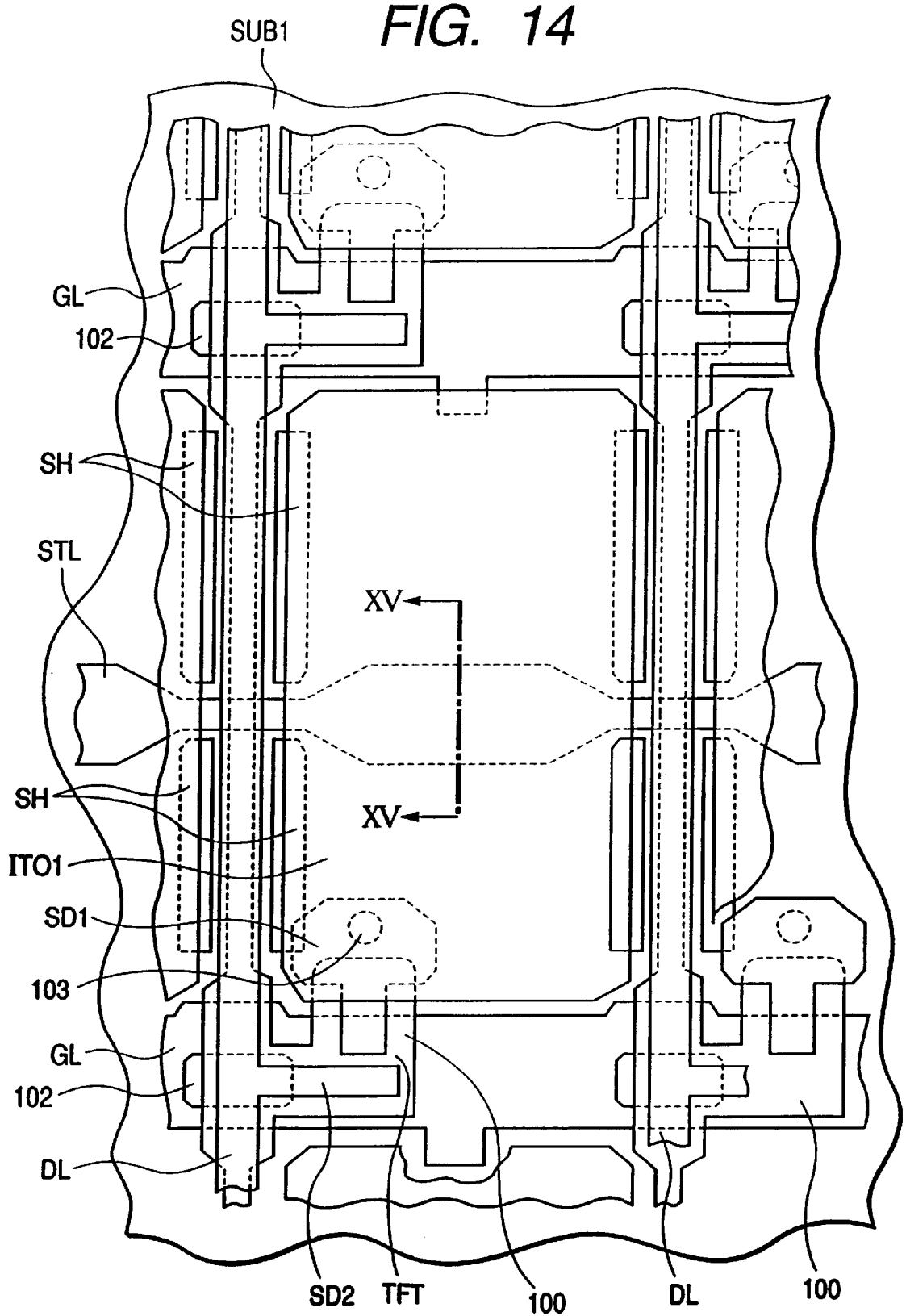
FIG. 14 is a plan view of essential parts of a unit pixel and its vicinity formed on a substrate of the storage type liquid crystal display element.
Figure 15:
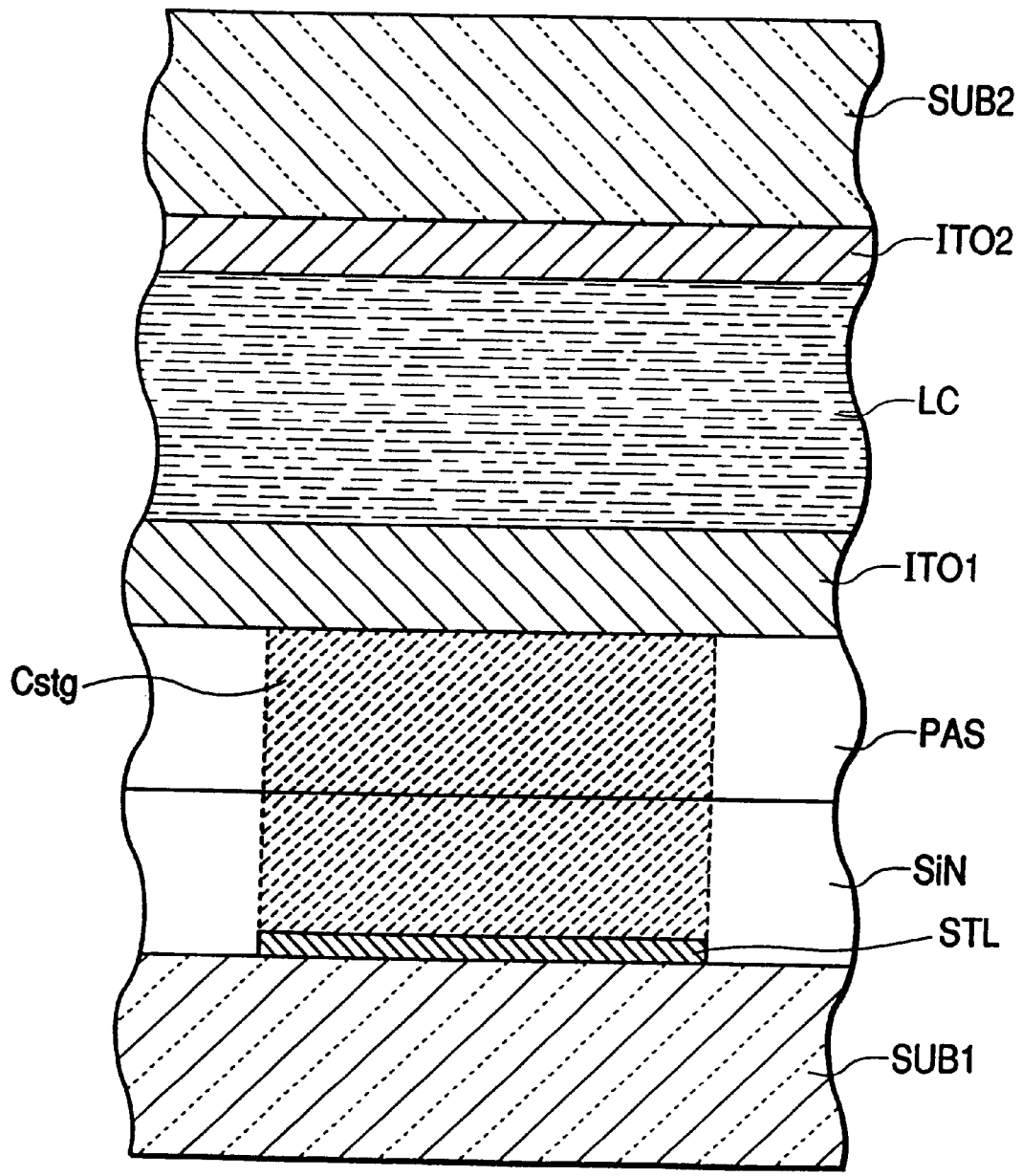
FIG. 15 is a schematic cross-sectional view of the storage type liquid crystal display element taken along line XV—XV of FIG. 14.
Figure 16:
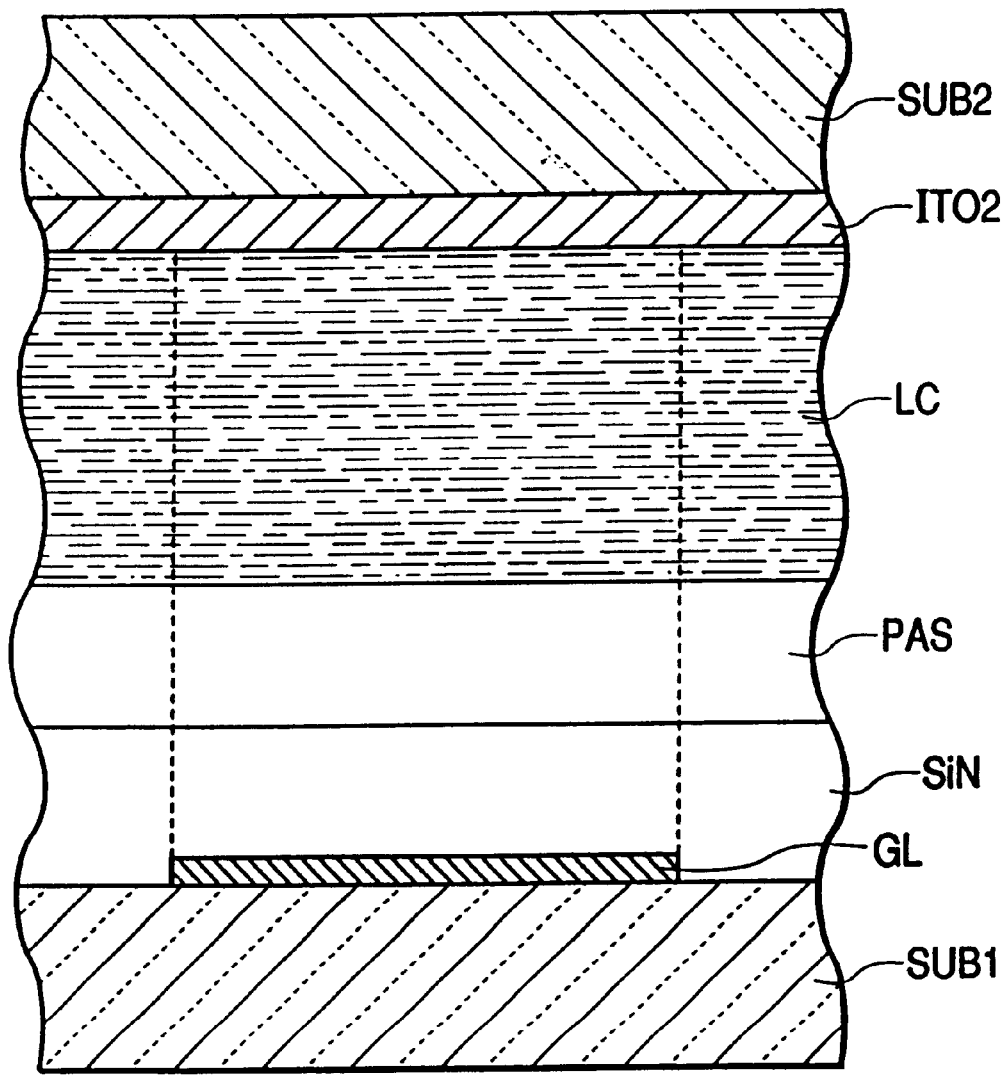
FIG. 16 is a schematic cross-sectional view of the liquid crystal display element for explaining a wiring capacitance formed by a gate line.
Figure 17:
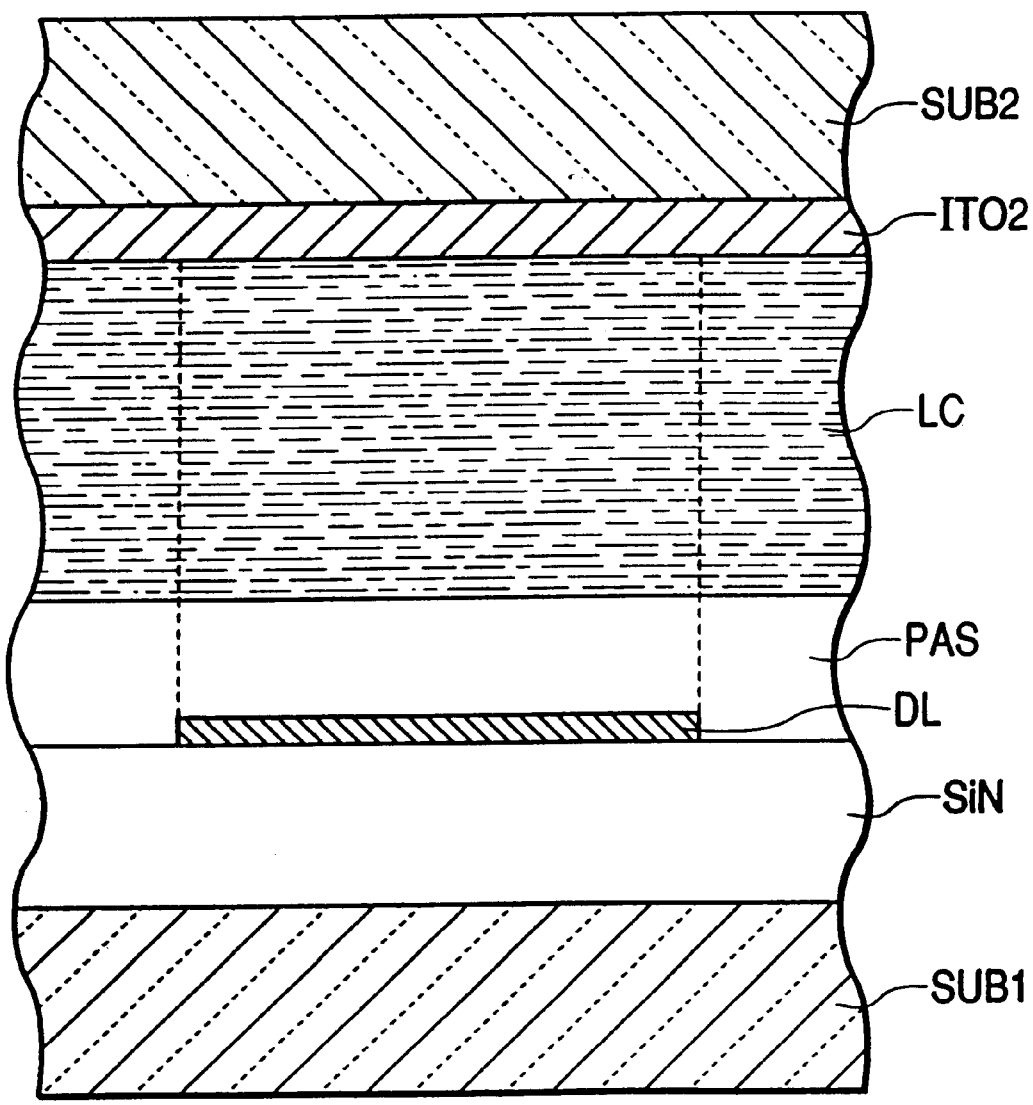
FIG. 17 is a schematic cross-sectional view of the liquid crystal display element for explaining a wiring capacitance formed by a drain line.
Figure 18:
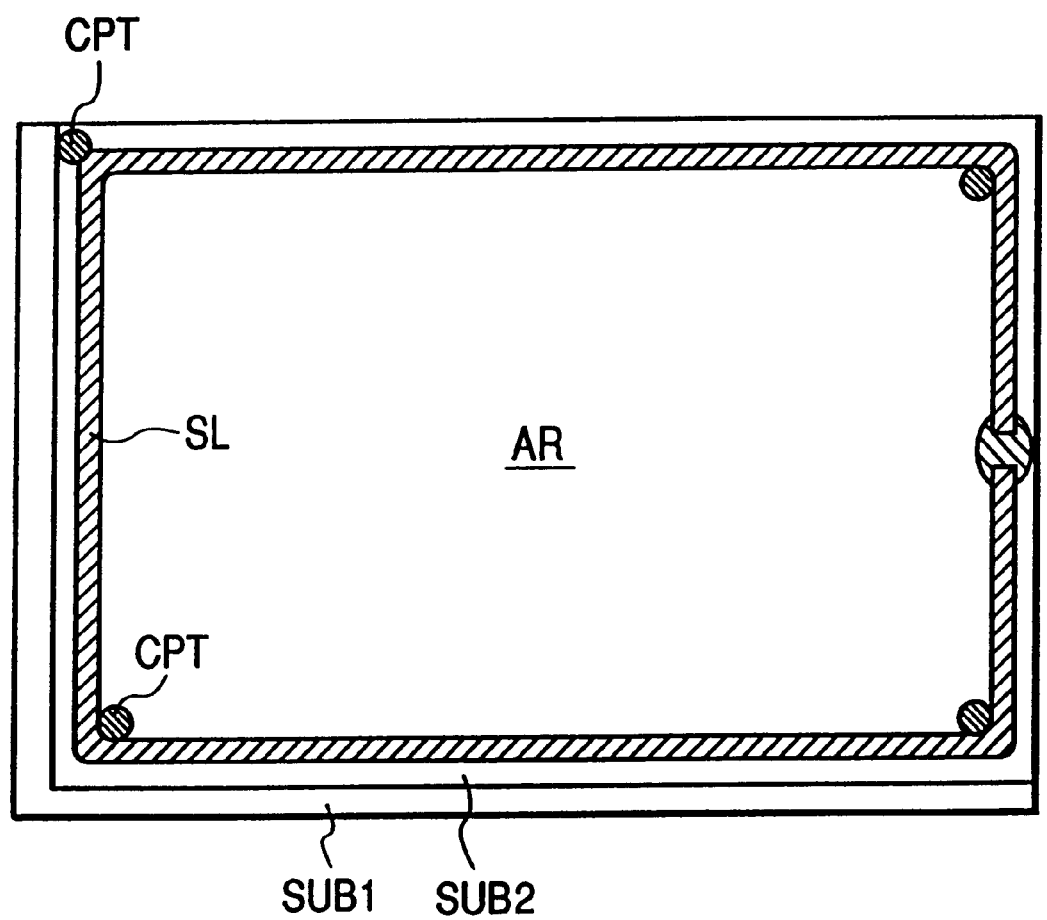
FIG. 18 is a schematic plan view of the liquid crystal display element for explaining an example of positions of conductive pastes for electrically connecting the common-electrode voltage supply line on one substrate to the common electrode on another substrate.

The storage line STL in FIGS. 1 and 2 is formed similarly to that shown in FIGS. 14 and 15. The opening ALC is made at least in the pixel electrode ITO1 overlying the storage line STL. The opening ALC can be made in one or both of the first insulating layer SiN and the second insulating layer PAS overlying the storage line STL in addition to the opening ALC in the pixel electrode ITO1, if necessary.

It is desirable that the projection of the contours of the opening ALC in the pixel electrode ITO1 on the storage line STL is within the contours of the storage line STL, and it is also desirable that the contours of the openings ALC in the first and second insulating layers SiN, PAS are identical to or within the contours of the opening ALC in the pixel electrode ITO1.

As in this embodiment, in a case where the storage line STL is provided to divide the area of the pixel electrode ITO1 (or the light-transmissive region of the pixel electrode ITO1 when the light transmission of the storage line STL is lower than that of the pixel electrode ITO1) into at least two parts, fluctuations in light transmission is negligible which is caused by non-uniformity of electric charge distribution in the pixel electrode ITO1 due to presence of the opening ALC, if the opening ALC is made in the pixel electrode ITO1 to have the above-described dimensional relationship.

By spacing the storage line STL and the pixel electrode ITO1 from each other by at least two kinds of insulating layers (PAS, SiN), if a fault such as a pinhole occur in one of the insulating layers, its adverse effects (for example, a short circuit between the storage line STL and the pixel electrode ITO1) is eliminated by the other of the insulating layers. Consequently, the above openings in the pixel electrode ITO1 or both of the pixel electrode ITO1 and the insulating layers PAS, SiN can be made to have a desired size without concern for possible faults in the insulating layers.

The opening ALC passes through all the thicknesses of the pixel electrode ITO1, the first insulating layer SiN and the second insulating layer PAS and opposes the storage line STL.

With this configuration, the storage capacity Cstg uses hatched portions of the first and second insulating layers SiN and PAS indicated in FIG. 2 as dielectrics, and is formed between a portion of the pixel electrode ITO1 along the opening ALC in the pixel electrode ITO1 and the storage line STL opposing the portion. The capacitance value of the storage capacitance Cstg can be controlled by the size of the opening ALC.

In the liquid crystal display device of this embodiment, it is desirable that the opening ALC is made in the pixel electrode ITO1 or both of the pixel electrode ITO1 and the insulating layers PAS, SiN in each of pixels contributing to an image display (in other words, pixels within the effective display area).

Further, in the present invention, the capacitance value of the storage capacity Cstg of each pixel is capable of being adjusted by the area of the opening ALC, and therefore this eliminates the complicated step for adjusting the size of the storage line STL. Thus, the width of the storage line STL in a direction perpendicular to a direction of extension of the storage line STL does not need to be reduced, and therefore an increase in the resistance of the storage line STL is suppressed. Consequently, electric charges having been stored in the pixel electrode ITO1 during one frame period can be removed from the pixel electrode ITO1 immediately in the next frame period.

Further, in this embodiment, the capacitance value of the storage capacitance Cstg can also be established by controlling the size of the opening ALC made in the pixel electrode ITO1 for each pixel such that there is little variation in capacitance value of the storage capacitance from pixel to pixel, and consequently, occurrence of a non-uniformity display and flicker due to variations in the storage capacitance Cstg can be prevented.

Figure 3:
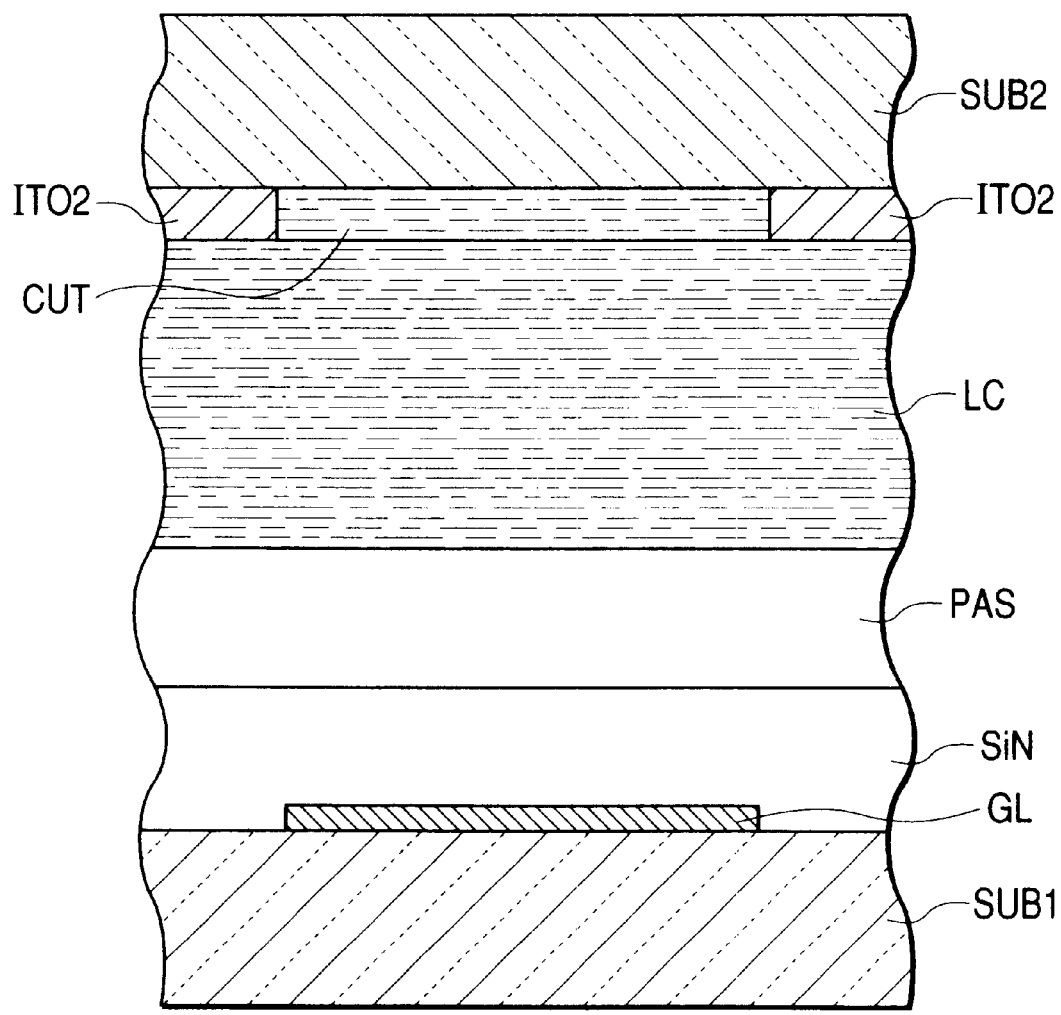
FIG. 3 is a schematic cross-sectional view of a second embodiment of the liquid crystal display element in accordance with the present invention for explaining a wiring capacitance formed by a gate line.
Figure 4:
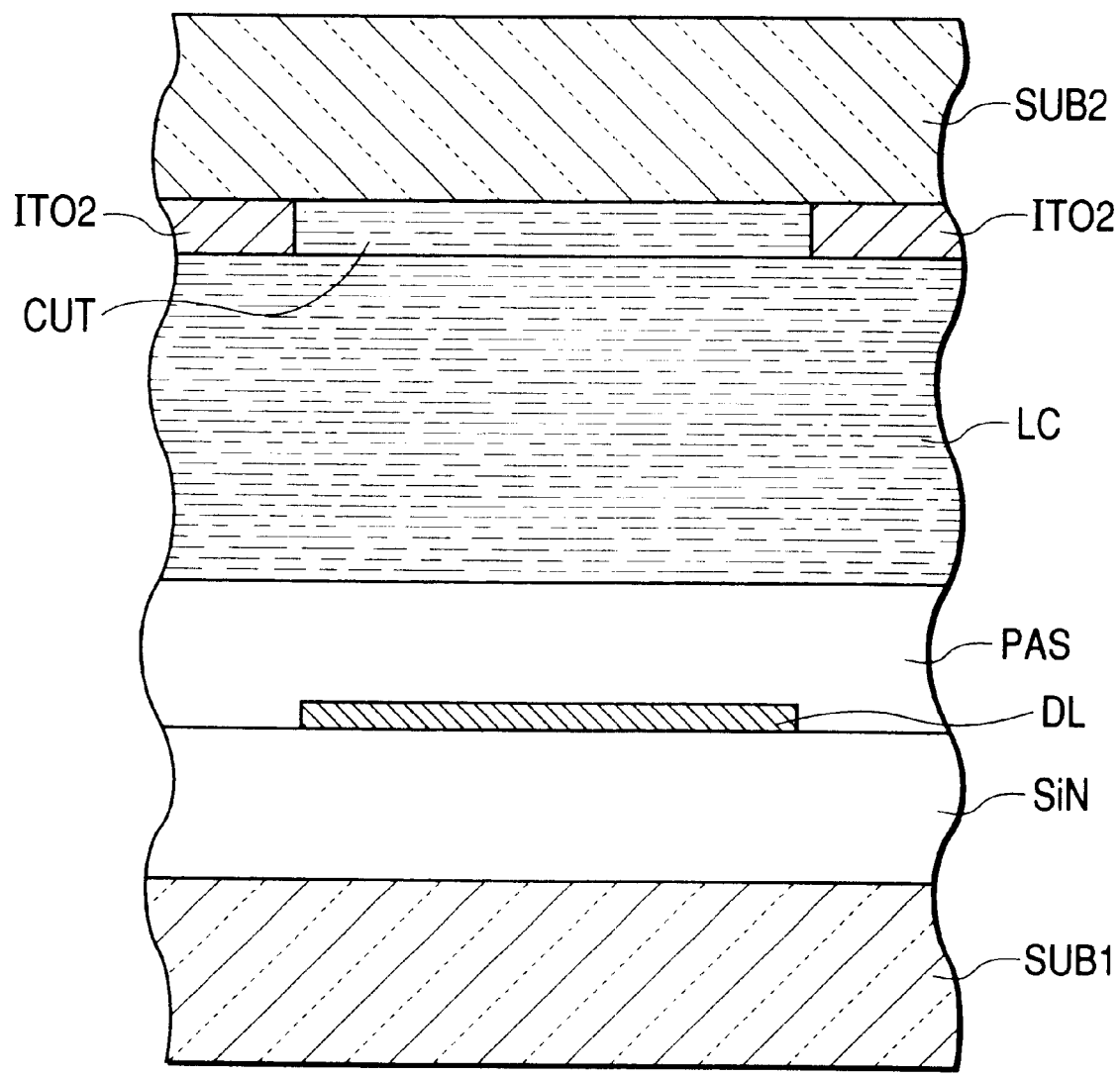
FIG. 4 is a schematic cross-sectional view of the second embodiment for explaining a wiring capacitance formed by a drain line.

FIG. 3 is a schematic cross-sectional view of a second embodiment of the liquid crystal display element in accordance with the present invention for explaining a wiring capacitance formed by the gate line GL, and FIG. 4 is a schematic cross-sectional view of the second embodiment for explaining a wiring capacitance formed by the drain line DL. In FIGS. 3 and 4, reference character CUT denotes cutouts made in the common electrode ITO2 formed on the substrate SUB2. The same reference characters and numerals as utilized in FIGS. 14 and 15 designate functionally corresponding portions in FIGS. 3 and 4.

In this embodiment, the wiring capacitances formed between the gate line GL and the common electrode ITO2 and the wiring capacitance formed between the drain line DL and the common electrode ITO2 can be reduced to approximately zero, and as a result, time delay due to wiring is reduced and occurrence of flicker and brightness grading in a display can be prevented.

Figure 5:
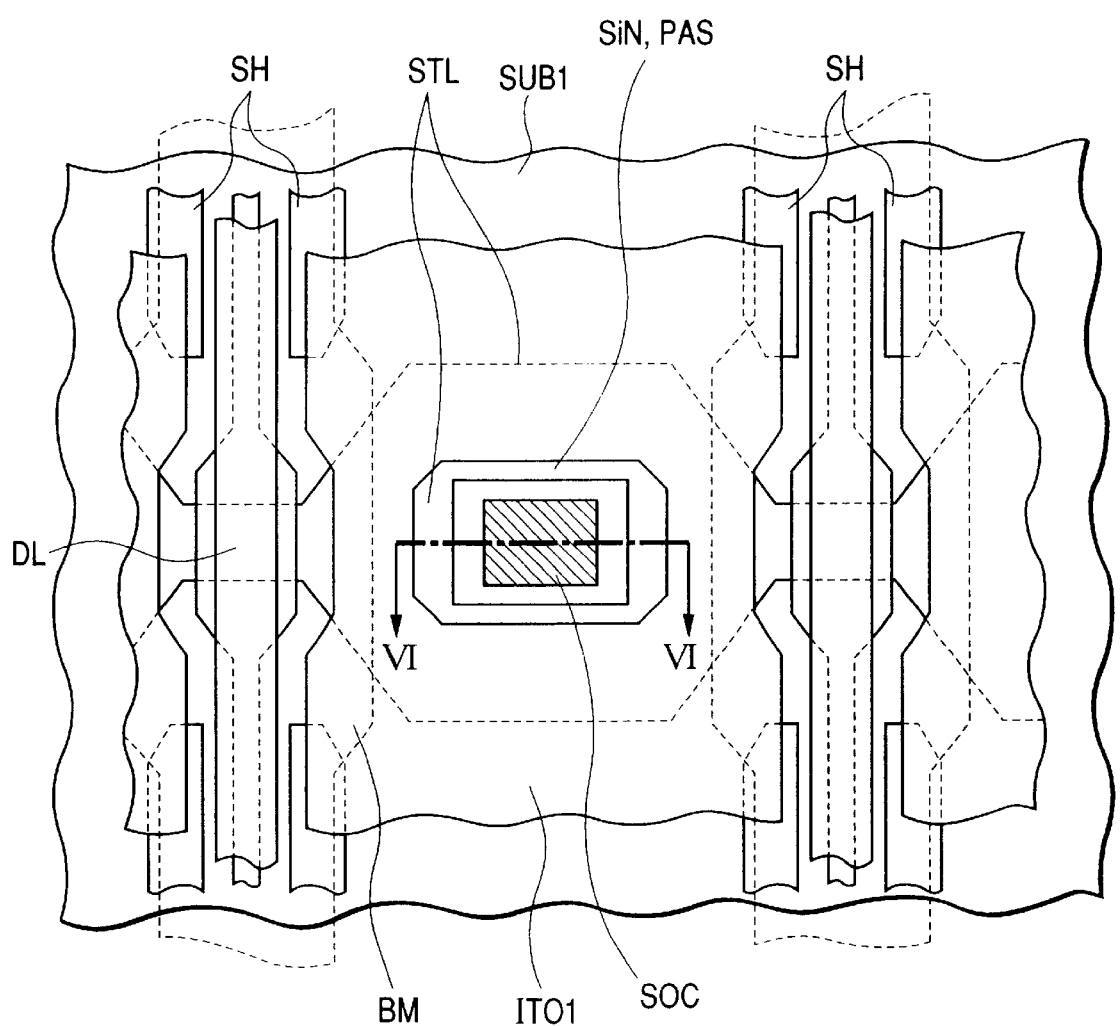
FIG. 5 is a plan view of essential parts of a third embodiment of the liquid crystal display element of the present invention for explaining a configuration of its storage line portion.
Figure 6:
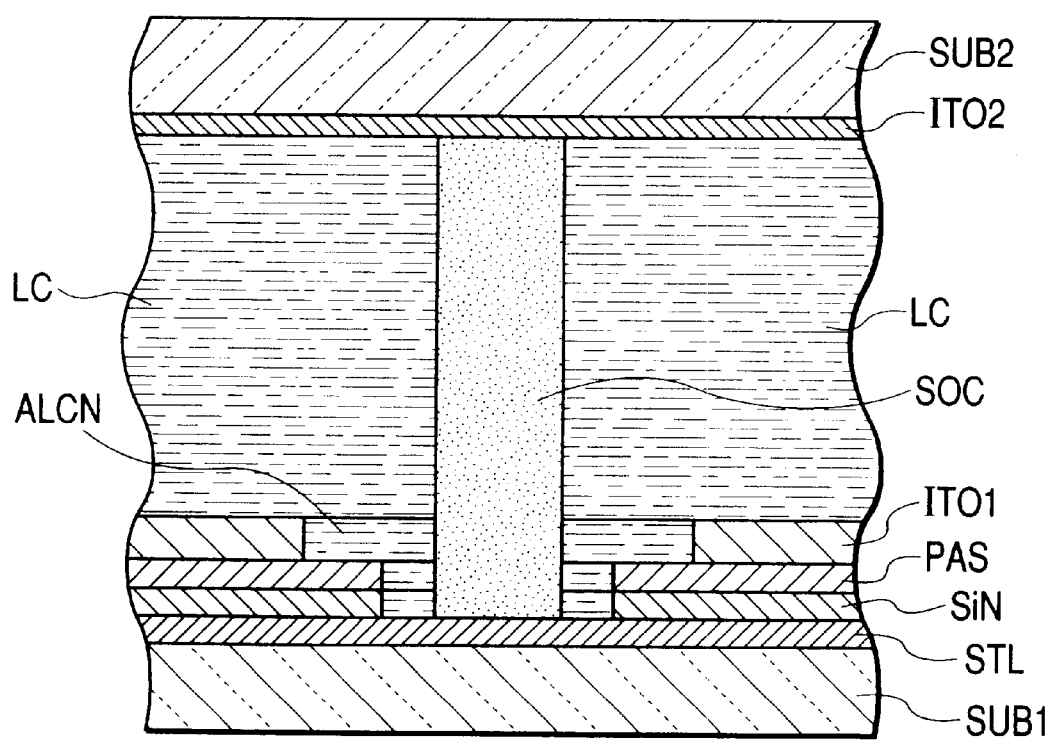
FIG. 6 is a schematic cross-sectional view of the liquid crystal display element taken along line VI—VI of FIG. 5.

FIG. 5 is a plan view of essential parts of a third embodiment of the liquid crystal display element of the present invention for explaining a configuration of its storage line STL portion, and FIG. 6 is a schematic cross-sectional view of the liquid crystal display element taken along line VI—VI of FIG. 5. In FIGS. 5 and 6, reference character SOC denotes a conductive column-like spacer, SH is a light-shielding member, and the same reference characters and numerals as utilized in FIGS. 1–4 designate functionally corresponding portions in FIGS. 5 and 6.

The conductive column-like spacer SOC is shaped from a photosensitive resin having carbon black dispersed therein or a conductive polymer, for example. For the former, a material capable of being hardened by photolithography is suitable for the photosensitive resin. For the latter, for example, the conductive polymer may be a material belonging to poly-acetylene system, poly-phenylene system, etc. mixed with dopants such as an arsenic compound $AsF_5$, sulfuric acid $H_2SO_4$ and iodine $I_2$ and a trace amount of a photoinitiator, or a heterocyclic polymer such as poly-pyrol, or an ionic polymer such as aromatic amine series. Functional groups of these materials may be modified so that their polymerization starts with irradiation of light such as ultraviolet light.

In this embodiment, an opening ALCN is made in the first insulating layer SiN, the second insulating layer PAS and the pixel electrode ITO1 formed over the storage line STL formed on the substrate SUB1, and a conductive column-like spacer SOC is disposed in the opening ALCN to electrically connect the storage line STL to the common electrode ITO2 on the other substrate SUB2.

This configuration eliminates the need for a voltage supply line for the storage line STL, and provision of the conductive column-like spacer SOC in each pixel prevents the brightness grading and flicker because the number of its voltage supply points is plural and as a result time delay due to wiring does not occur if the wiring length of the storage line STL is increased.

In FIGS. 5 and 6, the opening ALCN is such that the area of the opening in the pixel electrode ITO1 is larger than that of the opening in the underlying insulating layers PAS and SiN, and the reason for this is that fabrication of the conductive column-like spacer SOC is facilitated. There is no problem if the area of the opening in the pixel electrode ITO1 is made identical with that of the opening in the insulating layers PAS and SiN as in the case of FIGS. 1 and 2.

In FIG. 5, a contour of an opening of a black matrix BM formed on the other substrate SUB2 is indicated by broken lines for the purpose of reference.

Figure 7:
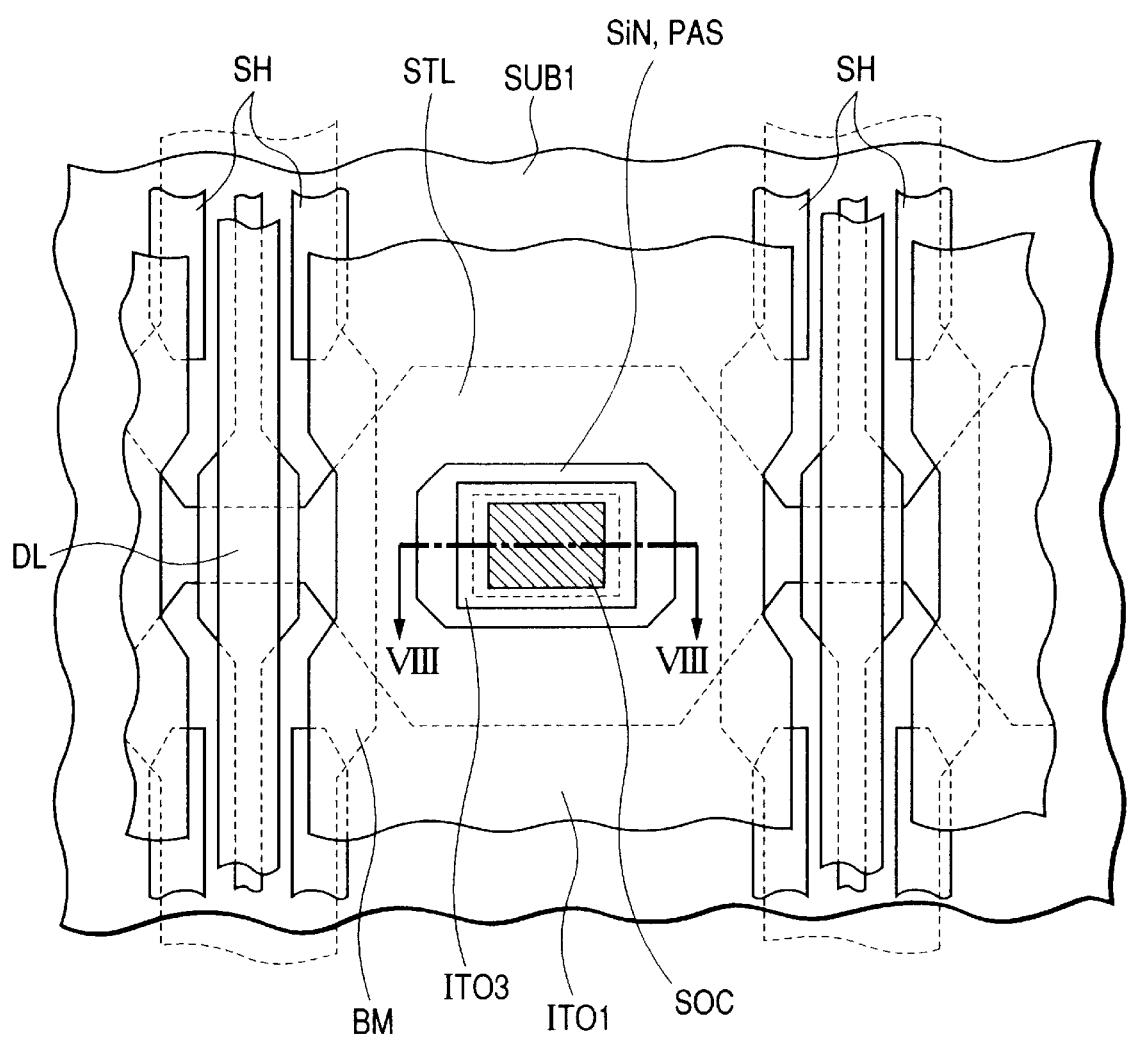
FIG. 7 is a plan view of essential parts of a fourth embodiment of the liquid crystal display element of the present invention for explaining a configuration of its storage line portion.
Figure 8:
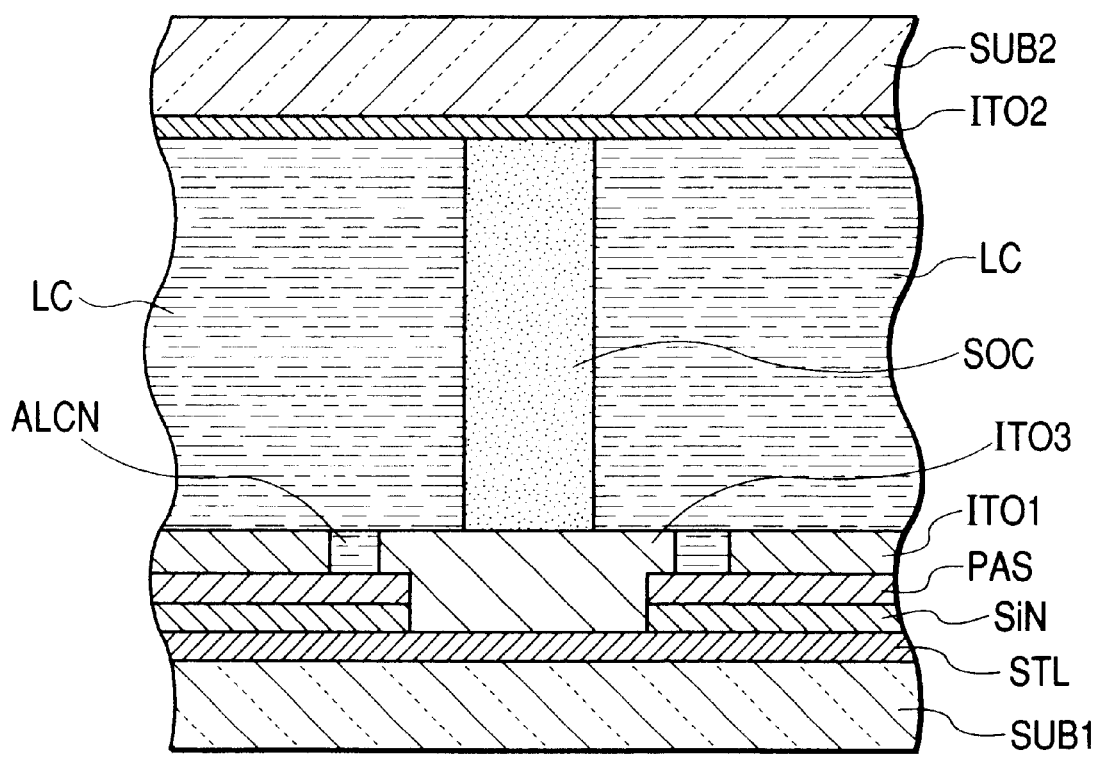
FIG. 8 is a schematic cross-sectional view of the liquid crystal display element taken along line VI—VI of FIG. 7.

FIG. 7 is a plan view of essential parts of a fourth embodiment of the liquid crystal display element of the present invention for explaining a configuration of its storage line STL portion, and FIG. 8 is a schematic cross-sectional view of the liquid crystal display element taken along line VIII—VIII of FIG. 7. In FIGS. 7 and 8, reference character ITO3 denotes a conductive layer, and the same reference characters and numerals as utilized in FIGS. 1–6 designate functionally corresponding portions in FIGS. 7 and 8.

In this embodiment, the conductive layer ITO3 is formed to cover the storage line STL at the bottom of the opening ALCN in Embodiment 3, and the conductive column-like spacer SOC is formed on the conductive layer ITO3.

The configuration of this embodiment prevents corrosion of the otherwise storage line STL, and thereby provides stable display characteristics for a long period of time in addition to the advantage provided by Embodiment 3.

Next, Embodiment 5 of the present invention will be explained.

In this embodiment, a second type conductive column-like spacer is used instead of the conductive paste CPT disposed in the vicinity of the sealing member SL in FIG. 8. The second type column-like spacer is similar in shape to the above-explained conductive column-like spacer (hereinafter the first column-like spacer) disposed in the pixel area, but is made to have a required area in cross section. This embodiment makes possible a voltage supply to the common electrode ITO2 without using the conductive paste, and reduces the number of manufacturing steps considerably by fabricating the second type column-like spacer simultaneously with the first type column-like spacers.

The following explains an example of a liquid crystal display device employing a liquid crystal display element of the present invention, in respect of a configuration of its driving circuit and application of the liquid crystal display device.

Figure 9:
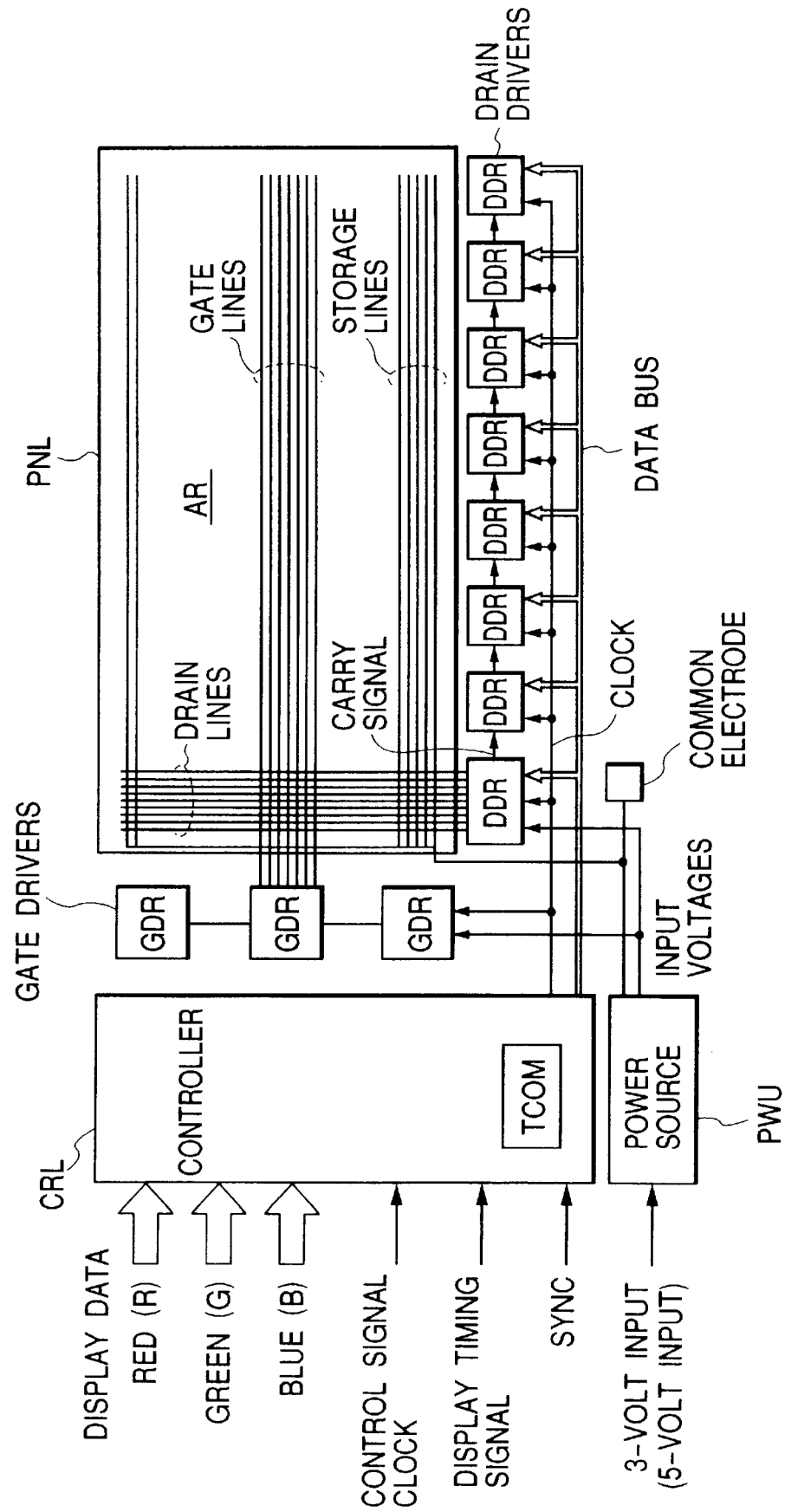
FIG. 9 is a block diagram for explaining an exemplary configuration of a driving system of a general active matrix type liquid crystal display device employing a liquid crystal display element of the present invention.

FIG. 9 is a block diagram for explaining an exemplary configuration of a driving system of a general active matrix type liquid crystal display device employing a liquid crystal display element of the present invention.

The liquid crystal display device includes: a liquid crystal display element PNL having a liquid crystal layer sandwiched between a pair of substrates; a circuit (IC chips) disposed at the periphery of the liquid crystal display element PNL for driving drain lines (also called data lines, drain signal lines or video signal lines), that is, the above-described drain driver DDR; a circuit (IC chips) disposed at the periphery of the liquid crystal display element PNL for driving gate lines (also called gate signal lines or scanning signal lines), that is, the above-described gate driver GDR; a display control device CRL serving as a display control means for supplying display data for an image display, clock signals and gray scale voltages to the drain driver DDR and the gate driver GDR; and a power supply circuit PWU. The display control device CRL is supplied with display data (the above-mentioned display signals) from external signal sources such as computers, personal computers, and TV receiver circuits, control signal clocks, display timing signals and syn signals.

The display control device CRL includes a gray-scale reference voltage generating section, a timing converter TCON and others, and converts the display data from the external source into data in format appropriate for a display on the liquid crystal display element PNL.

The display signals and clock signals for the gate driver GDR and the drain driver DDR are supplied as indicated in FIG. 9. A carry signal output from one stage of the drain driver DDR is given to a carry input of the next stage of the drain driver DDR.

A plurality of storage lines STL are disposed in parallel with the gate lines GL in the display area of the liquid crystal display element PNL. The storage lines STL are connected to the common electrode via the conductive column-like spacers explained in the above embodiments, and are supplied with a specified voltage from the power supply circuit PWU.

Figure 10:
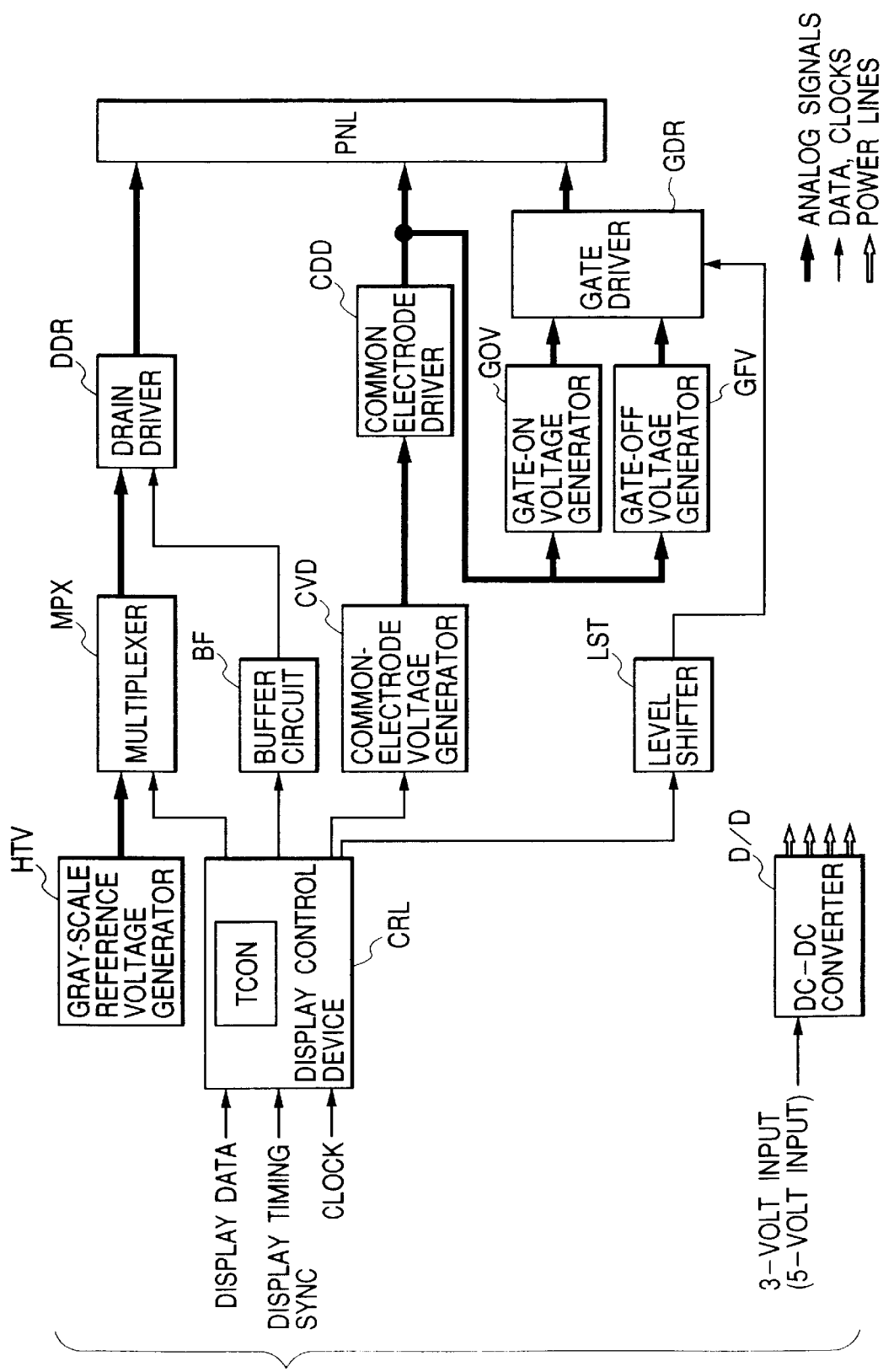
FIG. 10 is a block diagram showing rough configurations of respective drivers and flows of signals in the liquid crystal display element of FIG. 9.

FIG. 10 is a block diagram showing rough configurations of the respective drivers and flows of the signals in the liquid crystal display element of FIG. 9. The drain driver DDR comprises a data latch section for display data (display signals) such as video (picture) signals and an output-voltage generating circuit. There are a gray-scale reference voltage generating section HTV, a multiplexer MPX, a common-electrode voltage generating section CVD, a common-electrode driver. CDD, a level shift circuit LST, a gate-on voltage generating section GOV, a gate-off voltage generating section GFD, and a DC—DC converter D/D mounted on a board mounting the display control device CRL and the power supply circuit PWU shown in FIG. 9.

Figure 11:
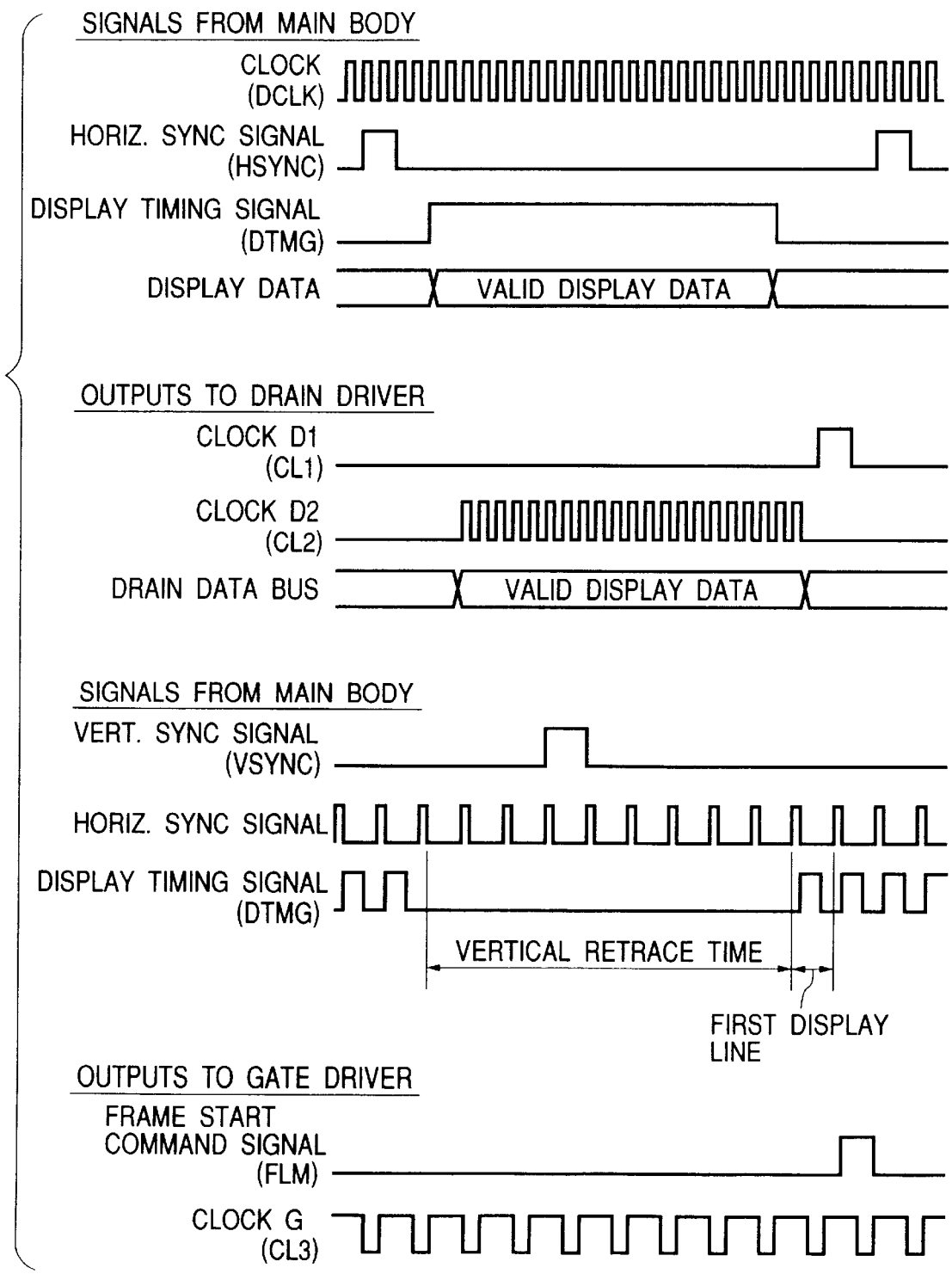
FIG. 11 is a timing chart showing display data supplied to a display control device from a signal source (a main body) and signals output from the display control device to a drain driver and a gate driver.

FIG. 11 is a timing chart showing display data supplied to the display control device CRL from a signal source (a main body) and signals output from the display control device CRL to the drain driver DDR and the gate driver GDR. The display control device CRL receives the control signals (the clock signals, display timing signals and syn signals) from the signal source and generates a clock D1 (CL1), a shift clock D2 (CL2) and display data as control signals for the drain driver DDR, and at the same generates a frame start command signal FLM, a clock G (CL3) and display data as control signals for the gate driver GDR.

Incidentally, in the case of a system of using low-voltage difference signals (LVDS signals) for transfer of display data from the signal source, the LVDS signals from the signal source are converted into original signals by an LVDS receiving circuit mounted on the board (the interface board) mounting the display control device CRL, and then are supplied to the gate driver GDR and the drain driver DDR.

As is apparent from FIG. 11, the frequency of the shift clock signal D2 (CL2) for the drain driver DDR is the same as that of a clock signal (DCLK) supplied from the main computer or the like and display data, and is a high frequency of about 40 MHz in the case of an XGA liquid crystal display element. The liquid crystal display device of such a configuration has a feature of a thin profile and low power consumption and tends to be widely used as a display device in various fields in the future.

Figure 12:
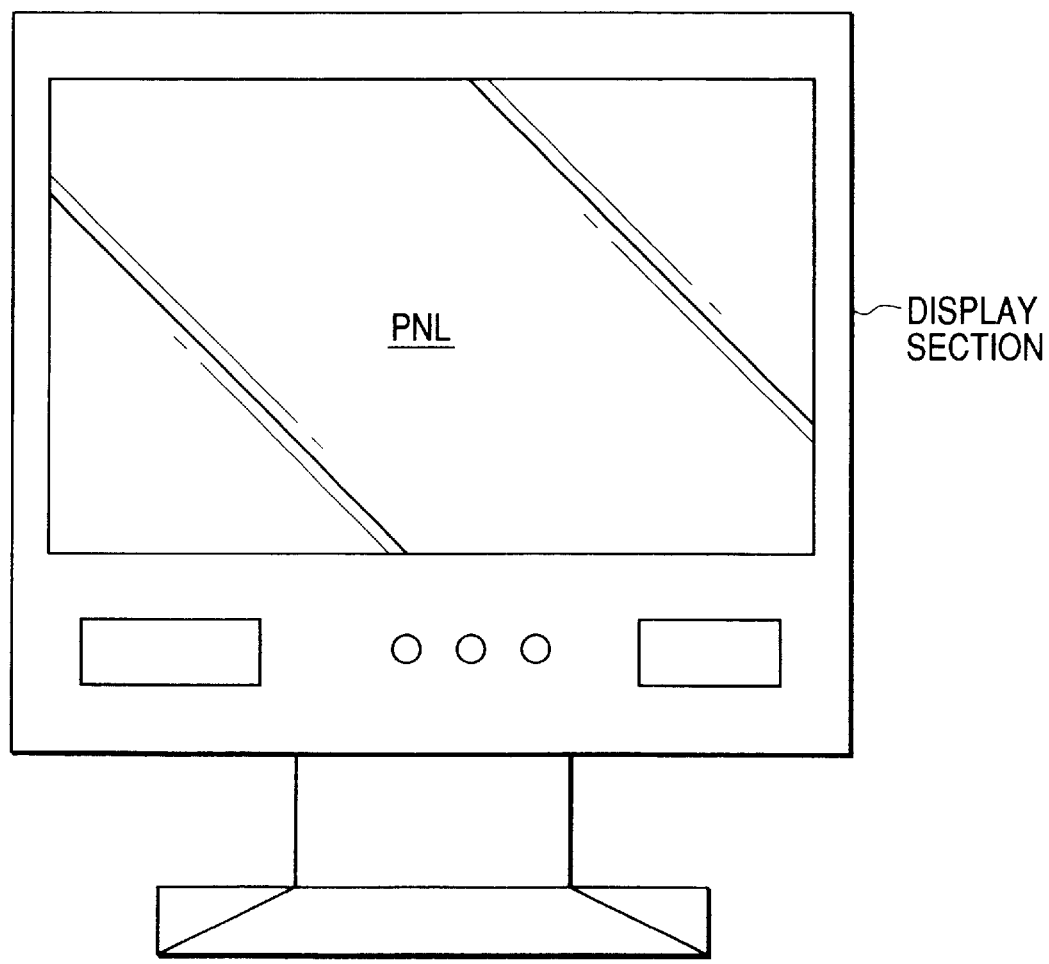
FIG. 12 is an external view of a display monitor as an example of electronic equipment incorporating a liquid crystal display device employing a liquid crystal display element of the present invention.
Figure 13:
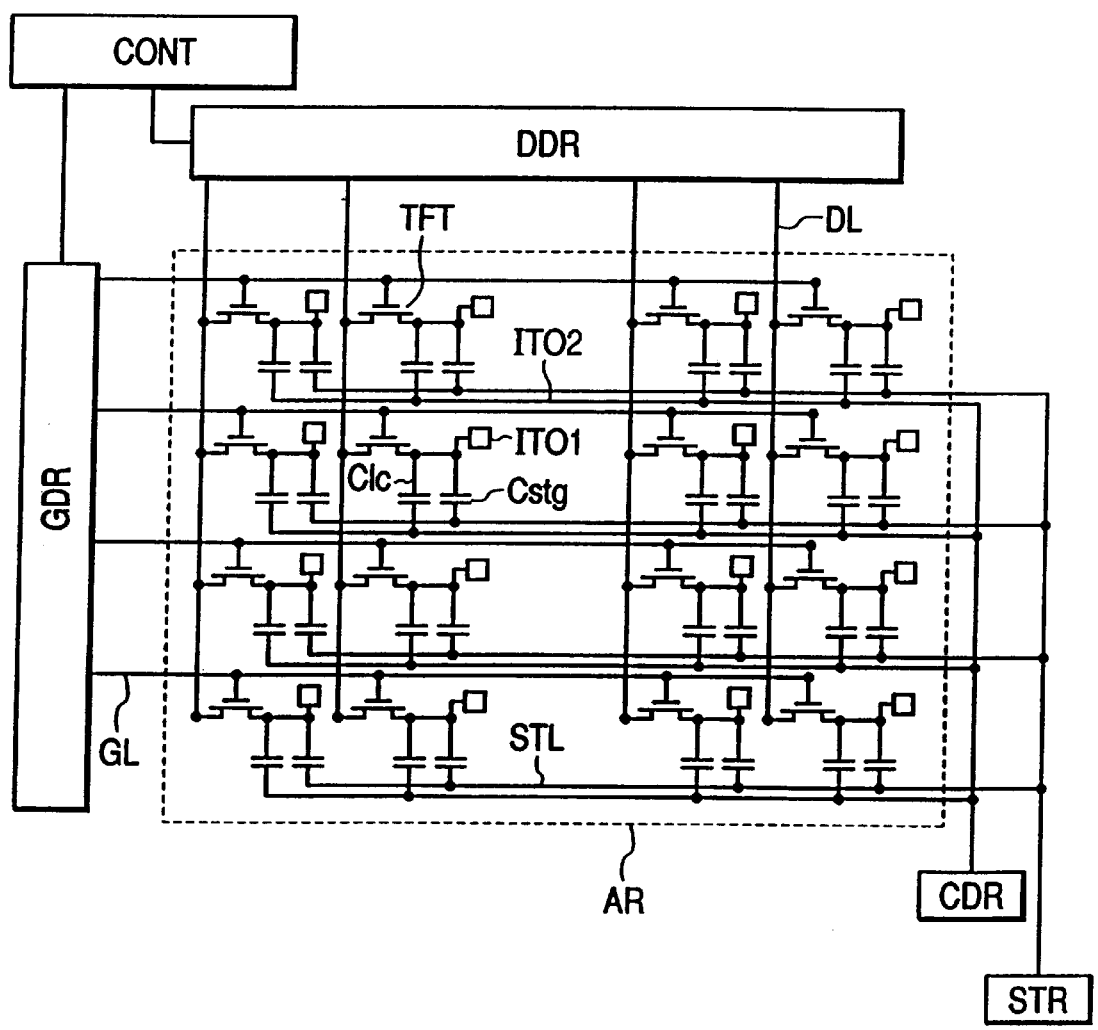
FIG. 13 is an equivalent circuit of a storage type liquid crystal display element.

FIG. 12 is an external view of a display monitor as an example of electronic equipment incorporating a liquid crystal display device employing the liquid crystal display element of the present invention. The liquid crystal display device is used as a display section of the display monitor.

The liquid crystal display element PNL constituting the liquid crystal display device of the display monitor has the storage lines and the conductive column-like spacers of the configuration explained in the above embodiments, has a storage capacitance appropriately established for each pixel, has wiring capacitances reduced, and is capable of providing a display free from occurrence of flicker and uniform in brightness over the entire display area with brightness grading eliminated.

It is needless to say that application of the liquid crystal display element of the present invention is not limited to such a display monitor, but the liquid crystal display element of the present invention can be used as a monitor of a desk-top personal computer and a display device of a notebook personal computer, a TV receiver, and other equipment.

As explained above, in the present invention, the storage capacitance formed by the storage line can be controlled by providing an opening in a pixel electrode, wiring capacitances of the gate lines and the drain lines are reduced by providing cutouts in the common electrode over the gate and drain lines, and manufacturing tact can be improved by disposing conductive column-like spacers between the common electrode and the storage lines such that voltage supply to the common electrode and the storage lines can be made without using any conductive pastes or by using the minimum number of the conductive pastes, and consequently, the present invention provides the high-quality liquid crystal display element.

What is claimed is:

1. A liquid crystal display element comprising:

a pair of substrates;

a liquid crystal layer sandwiched between said pair of substrates;

a plurality of gate lines disposed on one of said pair of substrates;

a plurality of drain lines disposed to be insulated from and intersect said plurality of said gate lines on said one of said pair of substrates;

a plurality of thin film transistors disposed in a vicinity of intersections of said plurality of gate lines and said plurality of drain lines;

a plurality of pixel electrodes made of transparent conductive material, each of said plurality of pixel electrodes being disposed in an area surrounded by two adjacent ones of said plurality of gate lines and two adjacent ones of said plurality of drain lines, and driven by a corresponding one of said plurality of thin film transistors;

a common electrode disposed on another of said pair of substrates to face said plurality of pixel electrodes; and a plurality of storage lines disposed below said plurality of pixel electrodes with an insulating layer interposed between said plurality of storage lines and said plurality of pixel electrodes, each of said plurality of pixel electrodes being formed with an opening in a portion thereof facing a corresponding one of said plurality of storage lines.

2. A liquid crystal display element according to claim 1, wherein said insulating layer is also formed with said opening, and a contour of said opening of said insulating layer is identical or within that of said opening of each of said plurality of pixel electrodes.

3. A liquid crystal display element according to claim 1, wherein a projection of a contour of said opening in said pixel electrode on said storage line is within a contour of said storage line.

4. A liquid crystal display element according to claim 1, wherein said insulating layer contains a first insulating film and a second insulating film stacked on said storage line in this order, said first insulating film is formed of silicon nitride, and said second insulating film is formed on said plurality of drain lines.

5. A liquid crystal display element according to claim 4, wherein said opening is made in one or both of said first insulating film and said second insulating film in addition to that in each of said pixel electrodes.

6. A liquid crystal display element according to claim 5, wherein a projection of a contour of said opening in said pixel electrode on said storage line is within a contour of said storage line, and a contour of said opening in said one or both of said first insulating film and said second insulating film is identical or within said contour of said opening in each of said plurality of pixel electrodes.

* * * * *